No. 799,177. PATENTED SEPT. 12, 1905.
V. MARTINETTO.
POWER TRANSMISSION SYSTEM.
APPLICATION FILED FEB. 18, 1904. RENEWED FEB. 13, 1905.
2 SHEETS—SHEET 2.
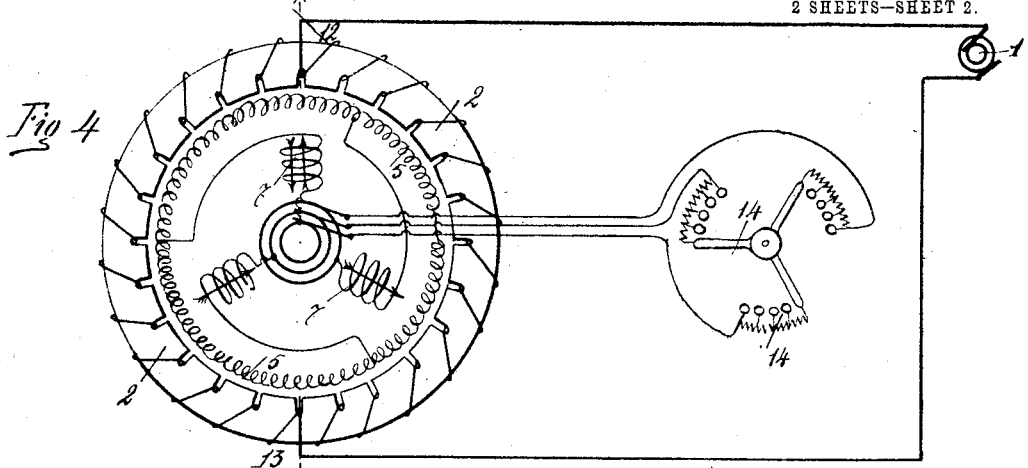
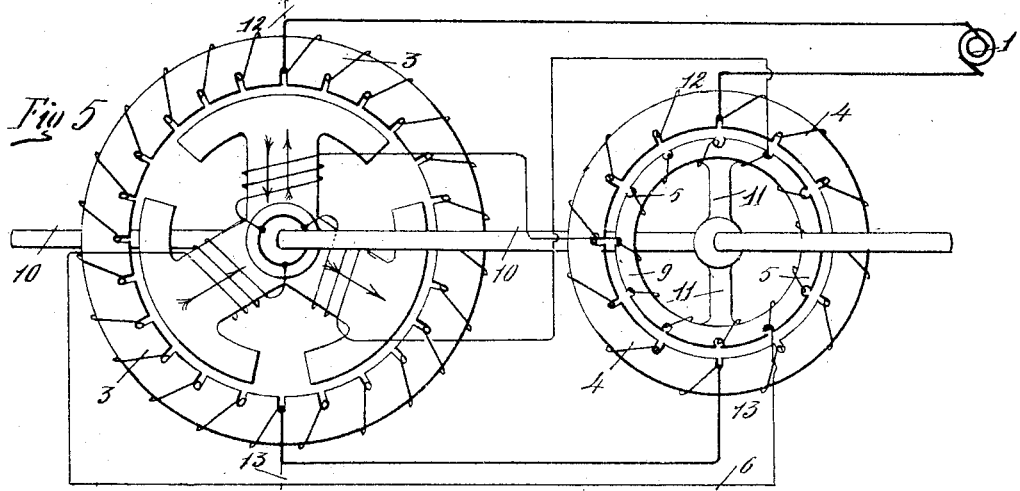
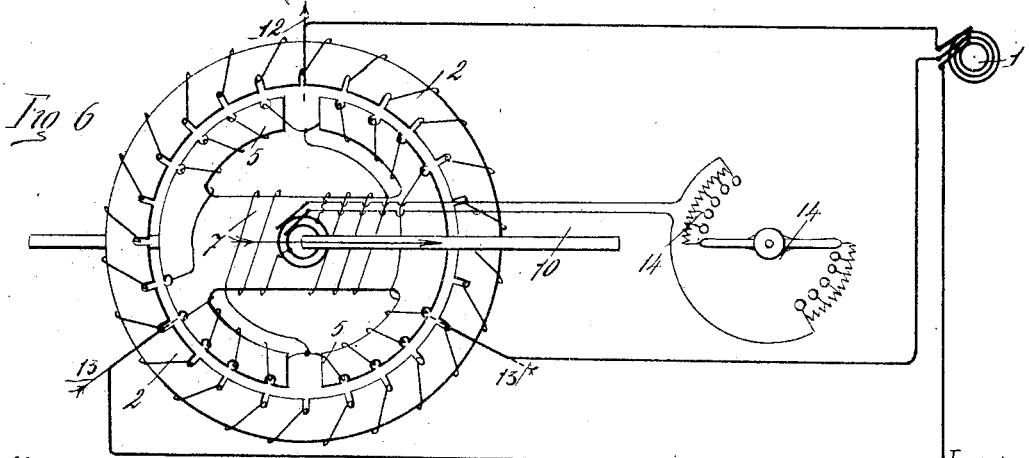
Witnesses
Harry R. L. White
Ray White
Inventor
Victor Martinetto
By Dwight B. Cheever
Attys

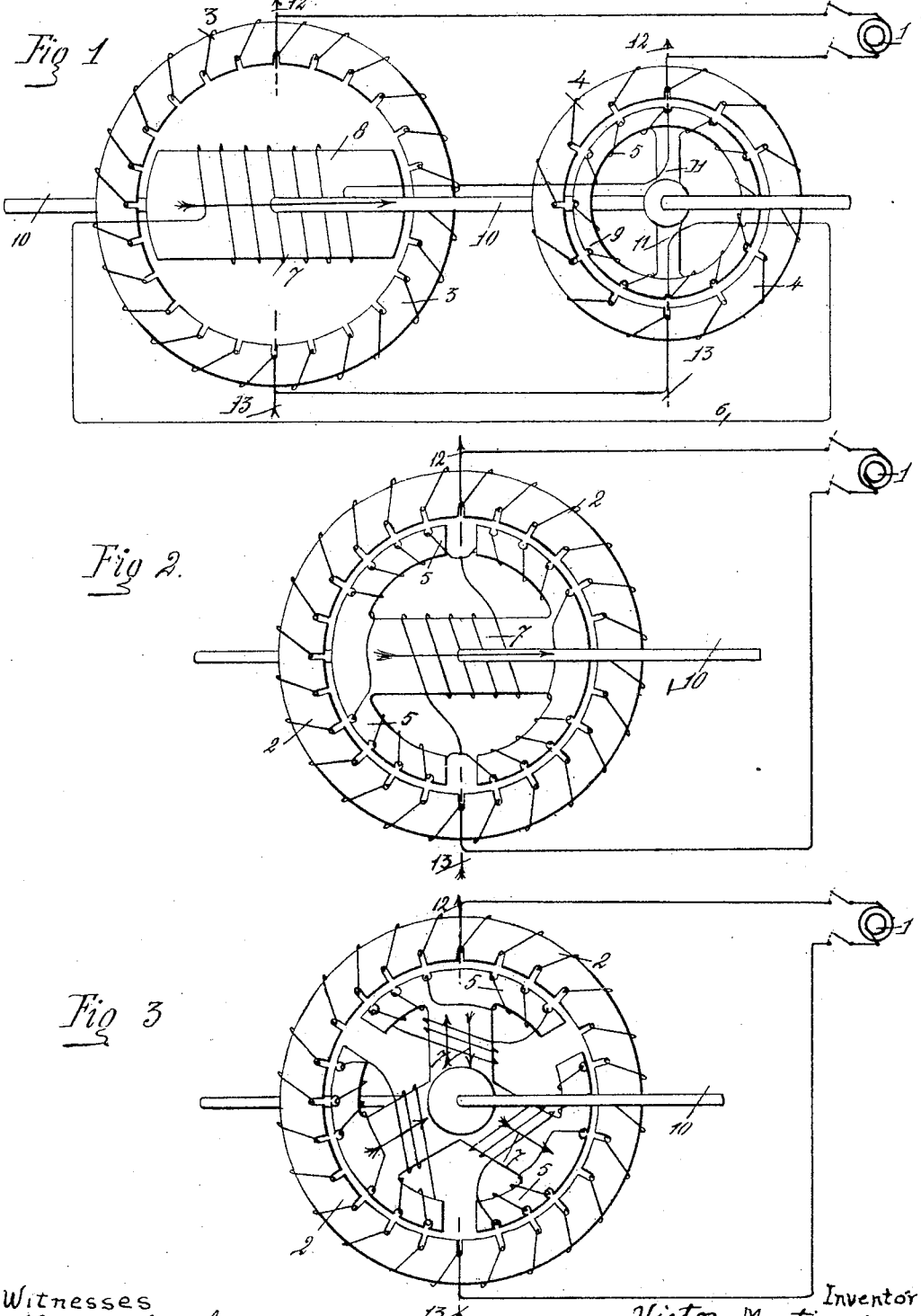

UNITED STATES PATENT OFFICE.

VICTOR MARTINETTO, OF CHICAGO, ILLINOIS, ASSIGNOR OF ONE-HALF TO HARRY L. BARTH, OF CHICAGO, ILLINOIS.

POWER-TRANSMISSION SYSTEM.

No. 799,177.      Specification of Letters Patent.      Patented Sept. 12, 1905.

Application filed February 13, 1904. Renewed February 13, 1905. Serial No. 245,400.

*To all whom it may concern:*

Be it known that I, VICTOR MARTINETTO, a citizen of Italy, residing at Chicago, in the county of Cook and State of Illinois, have invented a new and useful Power-Transmission System, of which the following is a specification in its best form now known to me, reference being had to the accompanying drawings, in which similar numerals indicate the same parts throughout the several views.

My invention relates to the distribution of power by electrical energy, and has its most important embodiment in a system wherein alternating current is supplied to a motor, and has for a main object the provision of means whereby very effective starting torque may be secured in the motor.

In practicing my invention I have connected an alternating-current generator with the windings of a motor having a peculiar novel arrangement to effect the purpose for which the invention has been devised.

Generally speaking, in the preferred embodiment of my invention I employ a motor having an inducing-winding supplied with current from a generator, which may furnish either single or polyphase current. This inducing winding sets up magnetic flux in which a second winding is inductively disposed, so that current may be induced therein from the field due to the first winding, a third winding being supplied with current from said second or induced winding, so as to set up lines of magnetic force, but which third winding is so disposed as to be substantially in non-inductive relation to the inducing-winding, but whose direct relation to the inducing-winding is preferably limited to a driving torque that is set up between the flux due to the inducing-winding and the flux due to the said third winding that receives its current from the said second or induced winding. The induced winding thus acts as an exciter to supply current to the third winding to enable the same to produce a field which in combination with the field of the inducing-winding is sufficient to exert the proper driving torque. The induced winding and the additional winding supplied with current thereby are mechanically united and together constitute one element of the machine, the other element being the inducing-winding. One of these elements of the motor is mounted to rotate and the other is preferably stationarily mounted. In practice it is desirable, though not necessary, to rotate the mechanically-united windings. In order that there may be the proper starting torque, the mechanically-united windings are so related that when the current in the induced winding is at its maximum the axis of the field due to the companion to the said induced winding is angularly related to the axis of the field due to the inducing-winding, so that the starting torque is effected, as said magnetic axes tend constantly to coincide in the same plane. The current supplied from the induced winding to its companion is preferably in phase with the current in the companion winding and is consequently substantially in phase, in effect, with the current in the inducing-winding, for it is well known that a phase displacement of one hundred and eighty degrees is substantially the same as identity in phase between alternating currents.

I will explain my invention more fully by reference to the accompanying drawings, in which—

Figure 1 illustrates a system of single-phase alternating current operating a motor whose inducing-winding is subdivided into two sets of coils, with one of which sets of coils the torque-producing coil of the motor is associated, while with the other set of inducing-coils the induced winding is associated. Fig. 2 illustrates a system similar to Fig. 1, excepting that the inducing-winding of the motor is common to both the induced winding and the torque-producing coil. Fig. 3 illustrates a system similar to Fig. 2, excepting that the rotating element of the motor is adapted to set up a number of poles unequal to the number of poles due to the inducing-winding, whereby the motor is made self-starting in every position, this being a very important feature of my invention. Fig. 4 is a view showing an adaptation of the invention to a variable-speed motor. Fig. 5 is a view showing apparatus somewhat similar to Fig. 4, excepting that the induced winding is separated from the torque-producing winding, the speed-modifier being also omitted. Fig. 6 illustrates the adaptation of the invention to a polyphase system, the motor illustrated being adapted for variable speed, the motor being adapted to start from every position.

Like parts are indicated by similar characters of reference throughout the different figures.

I have indicated in Figs. 1 to 5, inclusive, a source of single-phase current 1, supplying current to an inducing-winding 2. In Figs. 1 and 5 the winding 2 is subdivided into or, more particularly speaking, replaced by a torque-producing winding 3 and a current-producing winding 4, whereby the functions of the field set up by the inducing-winding are separated, the portion 3 performing the one function stated and the portion 4 the function of furnishing a field by which current is set up by inductive action in the induced winding 5, as is well understood to those skilled in the art. The induced winding 5 preferably has a conductor 6 diametrically connected across the same, in which conductor a torque-producing winding 7 is included. The torque-producing winding 7 is provided with a core of laminated magnetic material 8, while the induced winding is provided with a core 9, mechanically connected in the arrangements illustrated in Figs. 1 and 5 by a shaft 10, upon which the cores 8 and 9 are keyed, the core 9 preferably having spokes 11, preferably of non-magnetic material, interposed between the same and the shaft 10.

In the construction illustrated in Fig. 1 the portions 3 and 4 of the inducing-winding are connected in series, the two halves of each portion being in multiple, so as to have each portion create a field whose magnetic axes are indicated at 12 13, there being a single axis in the embodiment of the invention illustrated in Fig. 1 for each inducing-winding portion, there being thereby set up by each winding portion two polar regions. The induced winding 5 is divided into two sections by the conductor 6 and also has produced in its core two polar regions. The inducing and induced windings are preferably provided in slotted cores, as salient poles are not desirable of the primary or inducing field in the apparatus illustrated.

It will be apparent that the impedance due to the winding 7 will cause the current in the winding 5 to be displaced in phase one hundred and eighty degrees from the current in the winding 4, the currents in the windings 4 and 5 being then, in effect, substantially in phase, as is well known to those skilled in the art. The windings 3 and 4 being in series, the currents therein are bound to be in phase.

In the arrangement illustrated in Figs. 1, 2, and 6 the axis of magnetization due to the coil 5 is at right angles to the axis of magnetization due to the coil 7, the latter axis being angularly disposed to the axis of the field produced by the portion 3 of the inducing-winding when the winding 5 is in its position of maximum effect.

By the arrangement illustrated in Fig. 1 the magnetism due to the current in the winding 7 is in phase with the current in and the magnetism due to the winding 5, which currents and magnetisms are displaced one hundred and eighty degrees from the current and magnetism due to the windings 3 and 4, which latter phase relation is incident to the impedance 7.

In Figs. 2, 3, 4, and 6 the windings 5 and 7 are provided upon a common core structure, the winding 5 being upon a slotted portion of the core structure and in inductive relation with the inducing-winding 2, whereas the winding 7 is so situated upon the balance of the core structure as to be placed in non-inductive relation with said winding 2. The winding 5 in the structures illustrated in Figs. 2, 3, 4, and 6 occupies generally the same relation to the winding 7 as illustrated and described in connection with Fig. 1, a main distinction being that the cores of the windings 5 and 7 are assembled in one structure, Fig. 6 illustrating a further distinction, in that the apparatus as there disclosed is adapted to a polyphase system. Another distinction between the structure shown in Fig. 1 and the structures illustrated in Figs. 2, 3, 4, and 6 resides in the fact that the winding 5 is not limited to the single function of supplying current to the winding 7, but also acts after the machine has reached speed in contributing to the driving torque.

The apparatus illustrated in Fig. 5 is similar to that illustrated in Fig. 1, excepting that the core 8 has three branches one hundred and twenty degrees apart, each branch bearing a section of the winding 7. This arrangement enables the motor to start from any position.

The structure shown in Fig. 3 is like that illustrated in Fig. 2, excepting that the core is divided into three branches separated one hundred and twenty degrees.

The advantage of the construction illustrated in Fig. 3 over that illustrated in Fig. 2 is that the structure of Fig. 3 will start from any position.

In Figs. 4 and 6 I have illustrated rheostats 14 in circuit with the windings 5 and 7 for the purpose of regulating the speed and the starting current. In the apparatus of Fig. 6 the same results are secured as are obtained by the machines illustrated in the other figures, and particularly are the same results secured by the apparatus illustrated in Fig. 6 as are obtained by the apparatus illustrated in Figs. 3, 4, and 5, as the machine may start from any position. In order that the machine may start from any position, the number of poles due to the inducing-winding should be different from the number of poles due to the induced winding, which characteristic is present in the said machines illustrated in Figs. 3, 4, 5, and 6.

It will be seen that the currents in the inducing winding and the torque-producing winding 7 are in phase, while the magnetic axes of the fields due to said windings are angularly displaced, preferably by ninety degrees.

While I have shown motor mechanism peculiarly adapted for heavy work, it is to be understood that I do not wish to be limited to the character of service that said motors are to perform, as embodiments of the invention are useful where the mechanical loads operated by the motors may be negligible.

It is obvious that a variety of changes may be made in the embodiment of my invention herein shown and particularly described without departing from the spirit thereof, and I do not, therefore, wish to be limited to the precise construction and arrangement herein shown; but,

Having thus described my invention, I claim as new and desire to secure by Letters Patent—

1. In a system of electrical distribution, the combination with a source of alternating current, of an inducing-winding supplied thereby, an induced winding, an additional winding substantially out of inductive relation with the inducing-winding, but whose field coöperates with the field of the inducing-winding to effect torque, and mechanically connected with the induced winding so that the axes of magnetization of the induced winding and said additional winding are angularly displaced, the induced winding having connections for supplying the said additional winding with current substantially in phase in effect with that in the induced winding, substantially as described.

2. In a system of electrical distribution, the combination with a source of alternating current, of an inducing-winding supplied thereby, an induced winding, an additional winding substantially out of inductive relation with the inducing-winding but whose field coöperates with the field of the inducing-winding to effect torque, and mechanically connected with the induced winding so that the axes of magnetization of the induced winding and said additional winding are angularly displaced, the induced winding having conductive connection with the additional winding to have the currents in said additional winding and the induced winding substantially in phase in effect, substantially as described.

3. In a system of electrical distribution, the combination with a source of alternating current, of an inducing-winding supplied thereby, an induced winding, an additional winding substantially out of inductive relation with the inducing-winding but whose field coöperates with the field of the inducing-winding to effect torque, and mechanically connected with the induced winding so that the axes of magnetization of the induced winding and said additional winding are angularly displaced, the induced winding having connections for supplying the said additional winding with current substantially in phase in effect with that in the induced winding, an inducing-winding furnishing a field for the induced winding and said additional winding that substantially has a single axial plane, substantially as described.

4. In a system of electrical distribution, the combination with a source of alternating current, of an inducing-winding supplied thereby, an induced winding, an additional winding substantially out of inductive relation with the inducing-winding but whose field coöperates with the field of the inducing-winding to effect torque, and mechanically connected with the induced winding so that the axes of magnetization of the induced winding and said additional winding are angularly displaced, the induced winding having conductive connection with the additional winding to have the currents in said additional winding and the induced winding substantially in phase in effect, the inducing-winding furnishing a field for the induced winding and said additional winding that substantially has a single axial plane, substantially as described.

5. In a system of electrical distribution, the combination with a source of alternating current, of an inducing-winding supplied thereby, an induced winding, an additional winding substantially out of inductive relation with the inducing-winding but whose field coöperates with the field of the inducing-winding to effect torque, and mechanically connected with the induced winding and receiving current therefrom so that when the current in the induced winding is at its maximum the axis of magnetization of said additional winding will be angularly displaced with respect to the axis of the inducing-field in which said additional winding is located, substantially as described.

6. In a system of electrical distribution, the combination with a source of alternating current, of an inducing-winding supplied thereby, an induced winding, an additional winding substantially out of inductive relation with the inducing-winding but whose field coöperates with the field of the inducing-winding to effect torque, mechanically connected with the induced winding and receiving current therefrom so that when the current in the induced winding is at its maximum the axis of magnetization of said additional winding will be angularly displaced with respect to the axis of the inducing-field in which said additional winding is located, and connections between the said additional winding and the induced winding effecting supply of current to the additional winding substantially in phase in effect with that in the induced winding, substantially as described.

7. In a system of electrical distribution, the combination with a source of alternating current, of an inducing-winding supplied thereby, an induced winding, an additional winding substantially out of inductive relation with the inducing-winding, but whose field coöperates with the field of the inducing-winding to effect torque, and mechanically connected with the induced winding so that the axes of magnetization of the induced winding and said additional winding are angularly displaced, the induced winding having connections for supplying the said additional winding with current substantially in phase in effect with that in the inducing-winding, the induced winding and said additional winding having a common core rotating in a common field induced by said inducing-winding, substantially as described.

8. In a system of electrical distribution, the combination with a source of alternating current, of an inducing-winding supplied thereby, an induced winding, an additional winding substantially out of inductive relation with the inducing-winding but whose field coöperates with the field of the inducing-winding to effect torque, and mechanically connected with the induced winding so that the axes of magnetization of the induced winding and said additional winding are angularly displaced, the induced winding having conductive connection with the additional winding to have the currents in said additional winding and the inducing-winding substantially in phase in effect, the induced winding and said additional winding having a common core rotating in a common field induced by said inducing-winding, substantially as described.

9. In a system of electrical distribution, the combination with a source of alternating current, of an inducing-winding supplied thereby, an induced winding, an additional winding substantially out of inductive relation with the inducing-winding but whose field coöperates with the field of the inducing-winding to effect torque, and mechanically connected with the induced winding so that the axes of magnetization of the induced winding and said additional winding are angularly displaced, the induced winding having connections for supplying the said additional winding with current substantially in phase in effect with that in the inducing-winding, an inducing-winding furnishing a field for the induced winding and said additional winding that substantially has a single axial plane, the induced winding and said additional winding having a common core rotating in a common field induced by said inducing-winding, substantially as described.

10. In a system of electrical distribution, the combination with a source of alternating current, of an inducing-winding supplied thereby, an induced winding, an additional winding substantially out of inductive relation with the inducing-winding but whose field coöperates with the field of the inducing-winding to effect torque, and mechanically connected with the induced winding so that the axes of magnetization of the induced winding and said additional winding are angularly displaced, the induced winding having conductive connection with the additional winding to have the currents in said additional winding and the inducing-winding substantially in phase in effect, the inducing-winding furnishing a field for the induced winding and said additional winding that substantially has a single axial plane, the induced winding and said additional winding having a common core rotating in a common field induced by said inducing-winding, substantially as described.

11. In a system of electrical distribution, the combination with a source of alternating current, of an inducing-winding supplied thereby, an induced winding, an additional winding substantially out of inductive relation with the inducing-winding but whose field coöperates with the field of the inducing-winding to effect torque, and mechanically connected with the induced winding and receiving current therefrom so that when the current in the induced winding is at its maximum the axis of magnetization of said additional winding will be angularly displaced with respect to the axis of the inducing-field in which said additional winding is located, the induced winding and said additional winding having a common core rotating in a common field induced by said inducing-winding, substantially as described.

12. In a system of electrical distribution, the combination with a source of alternating current, of an inducing-winding supplied thereby, an induced winding, an additional winding substantially out of inductive relation with the inducing-winding but whose field coöperates with the field of the inducing-winding to effect torque, mechanically connected with the induced winding and receiving current therefrom so that when the current in the induced winding is at its maximum the axis of magnetization of said additional winding will be angularly displaced with respect to the axis of the inducing-field in which said additional winding is located, and connections between the said additional winding and the induced winding effecting supply of current to the additional winding substantially in phase in effect with that in the induced winding, the induced winding and said additional winding having a common core rotating in a common field induced by said inducing-winding, substantially as described.

13. A dynamo-electric machine including stationary and rotary wound elements adapted for use in alternating-current circuits, one of said elements including two mechanically-connected windings, one receiving current from the other, one in inductive relation with the winding of the remaining element and the other substantially out of inductive relation with said remaining element, the mechanically-united windings of the second element being so placed with respect to the remaining element that when current in the said inductively-related winding is at its maximum its companion winding is angularly disposed with respect to the axis of the field in which said companion winding is disposed, substantially as described.

14. A dynamo-electric machine including stationary and rotary wound elements adapted for use in alternating-current circuits, one of said elements including two mechanically-connected windings, one receiving current from the other, one in inductive relation with the winding of the remaining element and the other substantially out of inductive relation with said remaining element, the mechanically-united windings of the second element being so placed with respect to the remaining element that when current in the said inductively-related winding is at its maximum its companion winding is angularly disposed with respect to the axis of the field in which said companion winding is disposed, the connections between the said mechanically-united windings permitting the supply of current from one to the other of said windings to cause current in both of said windings to be substantially in phase, substantially as described.

15. A dynamo-electric machine including stationary and rotary wound elements adapted for use in alternating-current circuits, one of said elements including two mechanically-connected windings, one receiving current from the other, one in inductive relation with the winding of the remaining element and the other substantially out of inductive relation with said remaining element, the mechanically-united windings of the second element being so placed with respect to the remaining element that when current in the said inductively-related winding is at its maximum its companion winding is angularly disposed with respect to the axis of the field in which said companion winding is disposed, said mechanically-united windings having a common core rotating in a common field, substantially as described.

16. A dynamo-electric machine including stationary and rotary wound elements adapted for use in alternating-current circuits, one of said elements including two mechanically-connected windings, one receiving current from the other, one in inductive relation with the winding of the remaining element and the other substantially out of inductive relation with said remaining element, the mechanically-united windings of the second element being so placed with respect to the remaining element that when current in the said inductively-related winding is at its maximum its companion winding is angularly disposed with respect to the axis of the field in which said companion winding is disposed, the connections between the said mechanically-united windings permitting the supply of current from one to the other of said windings to cause current in both of said windings to be substantially in phase, said mechanically-united windings having a common core in a common field, substantially as described.

17. In a system of electrical distribution, the combination with a source of alternating current, of an inducing-winding supplied thereby, an induced winding, an additional winding substantially out of inductive relation with the inducing-winding, but whose field coöperates with the field of the inducing-winding to effect torque, and mechanically connected with the induced winding so that the axes of magnetization of the induced winding and said additional winding are angularly displaced, the induced winding having connections for supplying the said additional winding with current substantially in phase in effect with that in the inducing-winding, the induced winding and said additional winding having a common core rotating in a common field induced by said inducing-winding, the induced winding and said additional winding each furnishing poles different in number from the poles furnished by the inducing-winding, substantially as described.

18. In a system of electrical distribution, the combination with a source of alternating current, of an inducing-winding supplied thereby, an induced winding, an additional winding substantially out of inductive relation with the inducing-winding but whose field coöperates with the field of the inducing-winding to effect torque, and mechanically connected with the induced winding so that the axes of magnetization of the induced winding and said additional winding are angularly displaced, the induced winding having conductive connection with the additional winding to have the currents in said additional winding and the inducing-winding substantially in phase in effect, the induced winding and said additional winding each furnishing poles different in number from the poles furnished by the inducing-winding, substantially as described.

19. In a system of electrical distribution, the combination with a source of alternating current, of an inducing-winding supplied thereby, an induced winding, an additional winding substantially out of inductive relation with the inducing-winding but whose field coöperates with the field of the inducing-winding to effect torque, and mechanically connected with the induced winding so that the axes of magnetization of the induced winding and said additional winding are angularly displaced, the induced winding having connections for supplying the said additional winding with current substantially in phase in effect with that in the inducing-winding, an inducing-winding furnishing a field for the induced winding and said additional winding that substantially has a single axial plane, the induced winding and said additional winding each furnishing poles different in number from the poles furnished by the inducing-winding, substantially as described.

20. In a system of electrical distribution, the combination with a source of alternating current, of an inducing-winding supplied thereby, an induced winding, an additional winding substantially out of inductive relation with the inducing-winding but whose field coöperates with the field of the inducing-winding to effect torque, and mechanically connected with the induced winding so that the axes of magnetization of the induced winding and said additional winding are angularly displaced, the induced winding having conductive connection with the additional winding to have the currents in said additional winding and the inducing-winding substantially in phase in effect, the inducing-winding furnishing a field for the induced winding and said additional winding that substantially has a single axial plane, the induced winding and said additional winding each furnishing poles different in number from the poles furnished by the inducing-winding, substantially as described.

21. In a system of electrical distribution, the combination with a source of alternating current, of an inducing-winding supplied thereby, an induced winding, an additional winding substantially out of inductive relation with the inducing-winding but whose field coöperates with the field of the inducing-winding to effect torque, and mechanically connected with the induced winding and receiving current therefrom so that when the current in the induced winding is at its maximum the axis of magnetization of said additional winding will be angularly displaced with respect to the axis of the inducing-field in which said additional winding is located, the induced winding and said additional winding each furnishing poles different in number from the poles furnished by the inducing-winding, substantially as described.

22. In a system of electrical distribution, the combination with a source of alternating current, of an inducing-winding supplied thereby, an induced winding, an additional winding substantially out of inductive relation with the inducing-winding but whose field coöperates with the field of the inducing-winding to effect torque, mechanically connected with the induced winding and receiving current therefrom so that when the current in the induced winding is at its maximum the axis of magnetization of said additional winding will be angularly displaced with respect to the axis of the inducing-field in which said additional winding is located, and connections between the said additional winding and the induced winding effecting supply of current to the additional winding substantially in phase in effect with that in the induced winding, the induced winding and said additional winding each furnishing poles different in number from the poles furnished by the inducing-winding, substantially as described.

23. In a system of electrical distribution, the combination with a source of alternating current, of an inducing-winding supplied thereby, an induced winding, and an additional winding substantially out of inductive relation with the inducing-winding, but whose field coöperates with the field of the inducing-winding to effect torque, and mechanically connected with the induced winding so that the axes of magnetization of the induced winding and said additional winding are angularly displaced, the induced winding having connections for supplying the said additional winding with current, substantially as described.

24. In a system of electrical distribution, the combination with a source of alternating current, of an inducing-winding supplied thereby, an induced winding, and an additional winding substantially out of inductive relation with the inducing-winding, but whose field coöperates with the field of the inducing-winding to effect torque, and mechanically connected with the induced winding so that the axes of magnetization of the induced winding and said additional winding are angularly displaced, the induced winding having connections for supplying the said additional winding with current, the induced winding and said additional winding having a common core rotating in a common field induced by said inducing-winding, substantially as described.

VICTOR MARTINETTO.

Witnesses:
  DWIGHT B. CHEEVER,
  BLANCHE L. WEST.